US006071427A

United States Patent [19]

Raulinaitis

[11] Patent Number: 6,071,427

[45] Date of Patent: Jun. 6, 2000

[54] METHOD FOR MAKING A PRINTHEAD

[75] Inventor: Michael Raulinaitis, Lexington, Ky.

[73] Assignee: Lexmark International, Inc., Lexington, Ky.

[21] Appl. No.: 09/089,711

[22] Filed: Jun. 3, 1998

[51] Int. Cl.[7] .......... B41J 2/035; H01R 34/00; G11B 5/127

[52] U.S. Cl. .......... 216/27; 438/21; 347/50

[58] Field of Search .......... 216/27; 347/50; 438/21

[56] References Cited

U.S. PATENT DOCUMENTS

| | | | |
|---|---|---|---|
| 4,881,318 | 11/1989 | Komura et al. | 29/827 |
| 4,901,091 | 2/1990 | Kasamoto | 346/140 R |
| 4,989,317 | 2/1991 | Firl et al. | 29/840 |
| 5,016,023 | 5/1991 | Chan et al. | 346/1.1 |
| 5,132,707 | 7/1992 | O'Neill | 346/140 R |
| 5,278,584 | 1/1994 | Keefe et al. | 346/140 R |
| 5,300,959 | 4/1994 | McClelland et al. | 347/47 |
| 5,315,472 | 5/1994 | Fong et al. | 361/212 |
| 5,410,340 | 4/1995 | Drake et al. | 347/62 |
| 5,442,384 | 8/1995 | Schantz et al. | 347/20 |
| 5,515,089 | 5/1996 | Herko et al. | 347/63 |
| 5,519,421 | 5/1996 | Barr et al. | 347/47 |
| 5,528,272 | 6/1996 | Quinn et al. | 347/42 |
| 5,538,586 | 7/1996 | Swanson et al. | 156/307.6 |
| 5,565,901 | 10/1996 | Hawkins | 347/49 |

*Primary Examiner*—Randy Gulakowski
*Assistant Examiner*—Shamim Ahmed
*Attorney, Agent, or Firm*—Michael T. Sanderson

[57] ABSTRACT

The invention described in the specification relates to an improved method for making a printhead for an ink jet printer. In the method, one or more semiconductor substrates containing energy imparting devices for ink and electrical conductors for the energy imparting devices are attached to a metal substrate carrier. A conductive layer containing electrical tracing terminating in contact pads is also attached to the carrier using an adhesive. A nozzle plate is attached to the conductive layer and to the semiconductor substrate also using an adhesive. The nozzle plate, conductive layer and adhesive all have openings or windows therein for use in forming wire bonds between the semiconductor substrate and the conductive layer. Once the wire bonds having loops are formed, the wire loops are depressed toward the nozzle plate to reduce the height of the loops above the nozzle plate. The entire wires and bonds are then encapsulated in a elastomeric, insulative material to protect the wires. An advantage of the depressed wire loops is that the encapsulating material layer may be relatively thin so that it does not extend above the exposed surface of the nozzle plate more than about 15 mils thereby providing maximum clearance between the printhead a media to be printed.

13 Claims, 3 Drawing Sheets

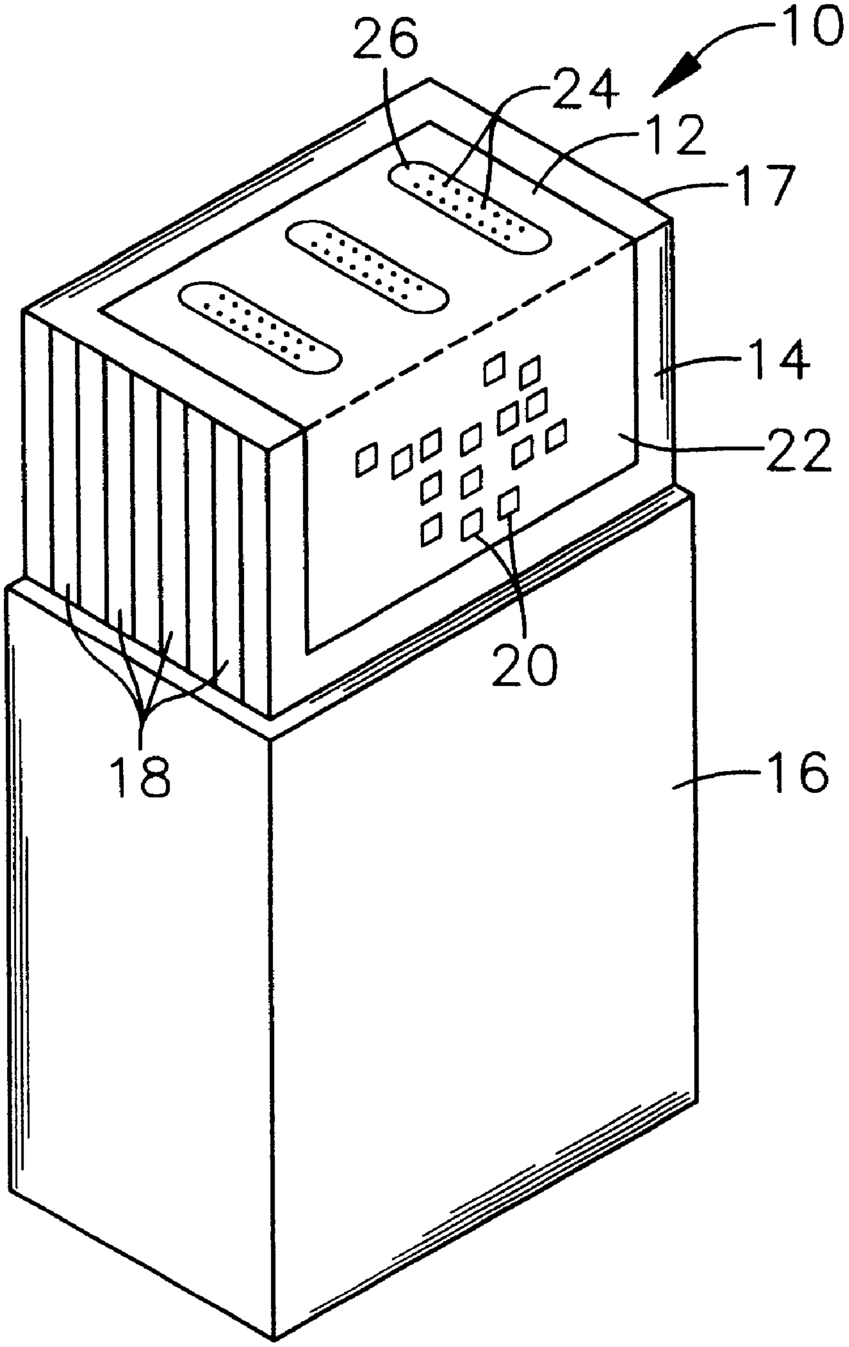
*Fig.* 1

METHOD FOR MAKING A PRINTHEAD

FIELD OF THE INVENTION

This invention relates generally to printheads for thermal ink jet print cartridges. More particularly, this invention relates to a manufacturing methods for manufacturing ink jet printheads.

BACKGROUND OF THE INVENTION

Ink jet printers utilize print cartridges having printheads for directing ink droplets onto a medium, such as paper, in patterns corresponding to the indicia to be printed on the paper. In general, ink is directed from a reservoir via flow paths to ink chambers and associated orifices or nozzles for release onto the paper. Heaters or other energy imparting devices are provided adjacent the nozzles for energizing the ink in the ink chambers in order to propel droplets of ink through the nozzle holes to provide a dot of ink on the paper. During a printing operation the print head is moved relative to the paper and ink droplets are released in patterns corresponding to the indicia to be printed by electronically controlling the energy imparting devices to selectively propel ink through only those nozzles for a given position of the printhead relative to the paper.

Printheads typically include a nozzle plate attached, as by adhesive, to a silicon chip containing the energy imparting devices. Electrical connections are provided to the chip to connect the energy imparting devices on the chip with the printer controller, usually be means of a flex circuit. A flex circuit is a plastic or polymeric tape containing electrical traces which are electrically connected to contact pads. The contact pads correspond to contact pads on the printer carriage and provide electrical continuity between the chip and the printer controller.

As the speed and print quality of ink jet printers increases, the number of nozzle holes and energy imparting devices on the printhead likewise increases. Increasing the size of the printheads or nozzle plates is not practical because the production yield of semiconductor chips decreases dramatically as the size of the chip increases. Accordingly, this requires closer spacing of the energy imparting devices for a given chip size.

Higher quality printing also requires that the ink droplets be ejected so they impact the printed media in a precise location. In order to reduce drop placement variability, it is preferred to space the printhead device closer to the print media. However, due to variability in the smoothness or planarity of the printheads themselves, printheads are required to be spaced a minimum distance from the print media in order to reduce or eliminate wear of the printhead caused by the print media rubbing against the printhead during printing.

Accordingly it is an object of the present invention to provide an improved method for manufacturing ink jet printheads.

Another object of the present invention is to provide a method of the character described which enables the production of printheads having greater reliability and performance characteristics as compared to printheads provided using conventional techniques.

A further object of the present invention is to provide a method for manufacturing a printhead having a greater clearance tolerance between the nozzle plate and print media than conventional printheads.

SUMMARY OF THE INVENTION

Having regard to the foregoing and other objects, the present invention is directed to a method for making a printhead for an ink jet printer. The method comprises providing a metal substrate carrier and at least one semiconductor substrate attached to the carrier, the semiconductor substrate containing energy imparting devices, electrical conductors for the energy imparting devices and electrical contacts for the conductors; attaching a conductive layer containing electrical tracing terminating in contact pads to the carrier; applying an adhesive to the conductive layer and to the semiconductor substrate, the adhesive containing first openings over the contact pads; bonding a nozzle plate to the adhesive layer on the carrier and semiconductor substrate, the nozzle plate having an outer surface and containing second openings over the contact pads on the conductive layer and third openings over the electrical contacts on the semiconductor substrate; connecting the electrical contacts with the contact pads using a wire bonding process to form wire loops sufficient for thermal expansion and contraction of the substrate and carrier; positioning the wire loops so that a highest portion of each wire is below about 10 mils above the outer surface of the nozzle plate; coating the electrical contacts, contact pads and wire loops with a silicone polymer coating to provide an ink jet printhead.

According to another aspect, the invention provides a method for making wire bond connections between a printhead semiconductor substrate and a flex circuit which comprises providing a flex circuit containing contact pads and first windows over the contact pads; bonding a nozzle plate onto the flex circuit, the nozzle plate having an exposed surface and containing second windows over the contact pads and third windows over electrical contacts on a semiconductor substrate; attaching a wire between the contact pads and electrical contacts, the wire having a loop height extending above the exposed surface of the nozzle plate; depressing the wire with a device to reduce the loop height to below about 8 mils above the exposed surface of the nozzle plate; and coating the wire and windows with a silicone polymer coating or other polymer coating having a thickness of less than about 8–15 mils above the exposed surface of the nozzle plate.

The method of the invention enables the manufacture of printheads using wire bond connections for the flex circuits having greater clearance tolerances between the printheads and paper or print media for improved quality and precision as compared to those manufactured using conventional techniques. Because the clearance tolerances are greater, the printhead may be spaced closer to the print media for improved printer performance without increasing the wear or abrasion of the printhead.

BRIEF DESCRIPTION OF THE DRAWINGS

Further advantages of the invention will become apparent by reference to the detailed description of preferred embodiments when considered in conjunction with the following drawings, which are not to scale so as to better show the detail, in which like reference numerals denote like elements throughout the several views, and wherein:

FIG. 1 is a perspective view of an ink jet cartridge having a printhead nose piece attached to an ink reservoir body in accordance with a preferred embodiment of the invention;

DETAILED DESCRIPTION OF THE INVENTION

Figure 3:
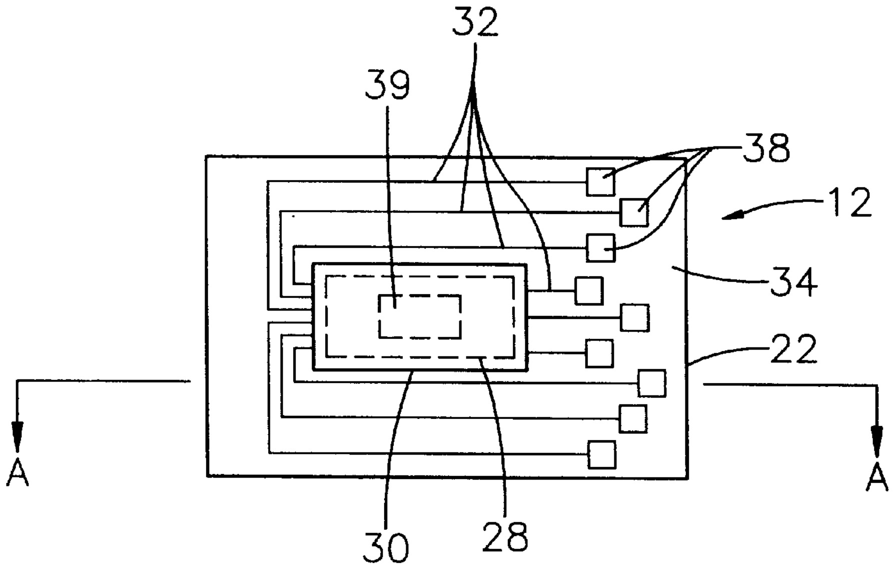
FIG. 3 is a bottom plan view of a printhead for a printer according to the invention.

Referring now to the figures, there is depicted in FIG. 1 a print cartridge 10 in accordance with a preferred embodiment of the invention for use with ink jet printers. The cartridge 10 includes a printhead assembly 12 located on a nose piece or carrier 14 attached to an ink reservoir body 16 provided as by a generally hollow plastic body containing ink, ink cartridges or a foam insert saturated with ink.

The printhead assembly 12 is preferably located on an upper portion 17 of the nose piece 14 which is preferably made of a material having relatively high thermal conductivity, e.g. such as about 50 watts per meter °K with suitable materials including a metal or metal alloy selected from magnesium, aluminum, zinc, gold, copper, silver, tungsten or beryllium, or a composite material such as a metal-ceramic material or a material containing a high concentration of carbon fibers or graphite. The nose piece 14 may also contain fins 18 for additional convective cooling of the nose piece 14.

Contact pads 20 are included on a strip of polymeric tape 22. The pads 20 are each in electrical continuity with a semiconductor substrate by means of electrical traces. The tape/electrical trace structure is referred to generally in the art as a "Flex circuit". The contact pads 20 correspond to contacts on the printer carriage for transferring electrical signals from a printer controller to a semiconductor substrate portion of the printhead assembly 12. The semiconductor substrate contains energy imparting devices for selectively expelling ink droplets toward a media to be printed from orifices holes 24 in a nozzle plate portion 26 of the printhead assembly 12.

Figure 2:
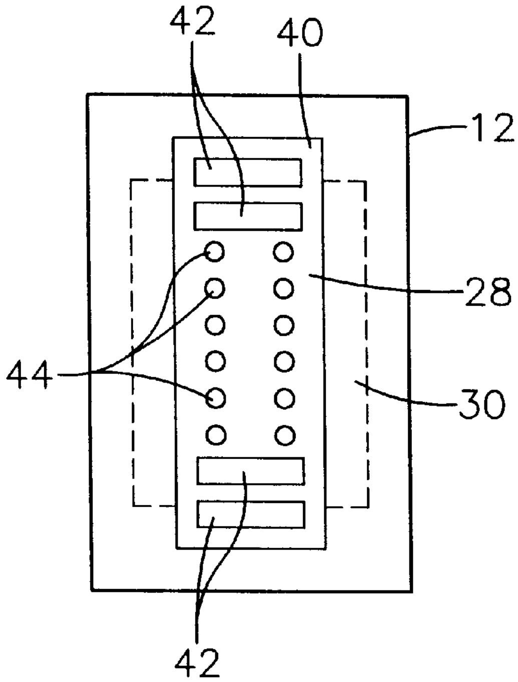
FIG. 2 is an enlarged top plan view of a portion of a printhead for a printer according to the invention.

With additional reference to FIGS. 2 and 3, the printhead assembly 12 preferably includes a nozzle member 28 attached, as by adhesive, to a silicon chip 30, with the silicon chip 30 being in electrical communication with a plurality of electrically conductive traces 32 which are contained on the back side 34 of the polymeric tape providing the flex circuit 22. A B-stageable thermal cure resin including, but not limited to phenolic resins, resorcinol resins, urea resins, epoxy resins, furane resins, polyurethane resins and silicone resins is preferably used to attach the nozzle member 28 to the silicon chip 30. The thickness of the adhesive layer preferably ranges from about 1 to about 25 microns.

The silicon chip 30 has a size typically ranging from about 2 to about 12 millimeters wide with a length ranging from about 6 to about 25 millimeters long and from about 500 to about 700 microns in thickness. The printhead assembly 12 may contain one, two, three or more silicon chips 30 and nozzle members 28 as shown in FIG. 1, however, for purposes of simplifying the description, the printhead assembly will be described as containing only one silicon chip 30 and associated nozzle member 28.

The nozzle member 28 and polymer tape or flex circuit 22 may be individually provided or may be integral with one another and are each preferably provided by a tape material, such as a polyimide polymer tape, having a thickness ranging from about 15 to about 200 microns. Suitable polyimide tapes include materials available from DuPont Corporation of Wilmington, Delaware under the trade name PYRALUX and from Rogers Corporation of Chandler, Arizona under the trade name R-FLEX. and from Mitsui Toatsu Chemicals, Inc. of Tokyo, Japan under the tradename REGULUS. However, it will be understood that a printhead assembly 12 in accordance with the present invention is applicable to nozzle members 28 made of virtually any material including also, but not limited to, metal and metal coated plastic.

Each trace 32 preferably terminates at a contact pad 38, with each pad 38 extending from the backside 34 through the tape 22 to the opposing or outer surface of the tape 22 for contacting corresponding electrical contacts of the ink jet printer carriage in order to conduct electrical signals from the printer controller to energy imparting devices on the silicon chip 30. The traces 32 may be provided on the tape as by plating processes and/or photo lithographic etching.

The silicon chip 30 is typically hidden from view in the assembled printhead and is preferably attached to nozzle member 28 using the adhesive as described above. When the silicon chip 30 is the same size as or smaller than the nozzle member 28, windows or cut out portions 42 are provided in the nozzle member 28 for the purposes of wire bonding the silicon chip 30 to the electrical traces 32. When the chip 30 is larger than the nozzle member 28, the nozzle member 28 need not contain windows 42 for connecting the electrical traces 52 to the silicon chip 54.

The nozzle member 28 is also provided with a plurality of nozzle holes 44. The nozzle holes 44 are preferably substantially circular or square in cross section. Both the nozzle holes 44 and the windows 42 may be made in the nozzle member 28 by conventional photoetching techniques or by laser ablating the nozzle member 28.

Figure 4:
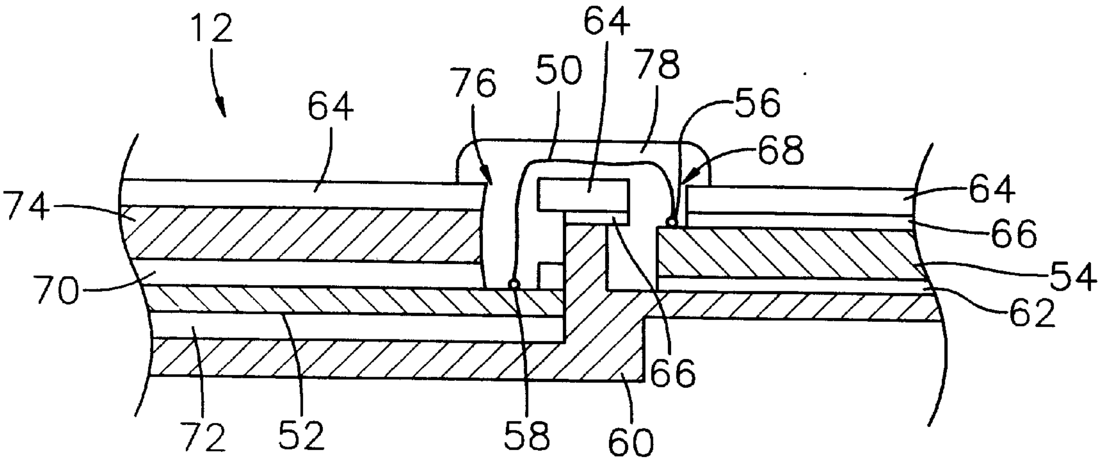
FIG. 4 is an enlarged partial cross-sectional view of a nozzle plate and semiconductor substrate assembly taken along A—A of FIG. 3.

As shown in cross-sectional view in FIG. 4 taken along A—A of FIG. 3, wires 50 are used to electrically connect the electrical traces 52 to the silicon chip 54 to enable electrical signals to be conducted from the printer to the silicon chip for selective activation of the energy imparting devices on the chip 54 during a printing operation. In the case of resistance heaters being used as the energy imparting devices, the heaters are electrically coupled to the conductive traces 52 via wires 50 and wire bonds 56 and 58.

During a printing operation, electrical signal are sent from a printer controller to activate the energy imparting devices on the chip to cause ink to be expelled through the holes 24 in the nozzle member 26 (FIG. 1) and deposited on a print media. In this regard, a demultiplexer 39 (FIG. 3) is preferably provided on the silicon chip 30 for demultiplexing incoming electrical signals and distributing them to the energy imparting devices on the chip 30.

In order to provide access to the chip 54 and traces 52, windows or openings are provided in each of the materials making up the printhead assembly 12. As shown in FIG. 4, the printhead assembly 12 includes a substrate carrier 60. A silicon chip 54 is bonded to the substrate carrier 60 as by an adhesive 62 which is preferably a heat conductive, electrically insulative adhesive based on silicones or epoxies such as ME-203 and ME-207 from Thermoset Plastics, Inc. of Indianapolis, Indiana.

A nozzle member 64 is preferably bonded to the opposing side of the silicon chip 54 as by a B-stageable adhesive 66 as described above. There is a window or opening 68 in the nozzle member 64 and adhesive 66 so that a wire 50 can be bonded to the silicon chip 54 at wire bond 56. The window depth is about 2 to 3 mils deep depending on the thickness of the nozzle member 64 and adhesive 66.

Electrical traces 52 are contained on a flex circuit or tape 70 which is likewise bonded to the substrate carrier 60 by means of an electrically insulative adhesive 72 such as acrylics, phenolics or polyesters. In order to provide a relatively planar surface, the nozzle member 64 may be extended over and bonded to the tape 70 or the tape 70 bonded to the nozzle member 64 using an adhesive layer 74. A suitable adhesive for layer 74 may be selected from an adhesive such as acrylics, phenolics or polyesters. A window 76 is also preferably provided in the nozzle member 64, adhesive 74 and tape 70 so that wire 50 can be connected to trace 52 by the wire bond 58. Window 76 preferably has an overall depth of from about 6 to about 10 mils depending on the thickness of the nozzle member 64, adhesive 74 and tape 70. The windows 68 and 76 in the nozzle member 64, adhesives 66 and 74 and in the tape 70 may be formed as by a conventional photo-etching or laser ablation technique.

Because of the depth of windows 68 and 76, it is preferred to loop the wire 50 over the nozzle member 64 in order to suitably connect wire 50 to wire bonds 56 and 58. A looped wire is preferred rather than providing a wire with no slack or loop in order to provide a sufficient length of wire so that expansion and contraction of the carrier material and/or silicon chip 54 during printing operations will not cause breakage of wire 50 or overly stress wire bonds 56 and 58 thereby breaking the connections between the electrical traces 52 and the silicon chip 54. Once the connections are made, the wire 52 and windows 68 and 76 are encapsulated in a elastomeric material 78 such as a silicone polymer coating having a coefficient of thermal expansion approximately equal to that of the wire 50. Other suitable elastomeric materials include, but are not limited to silicone, polyurethane and acrylates.

Figure 5:
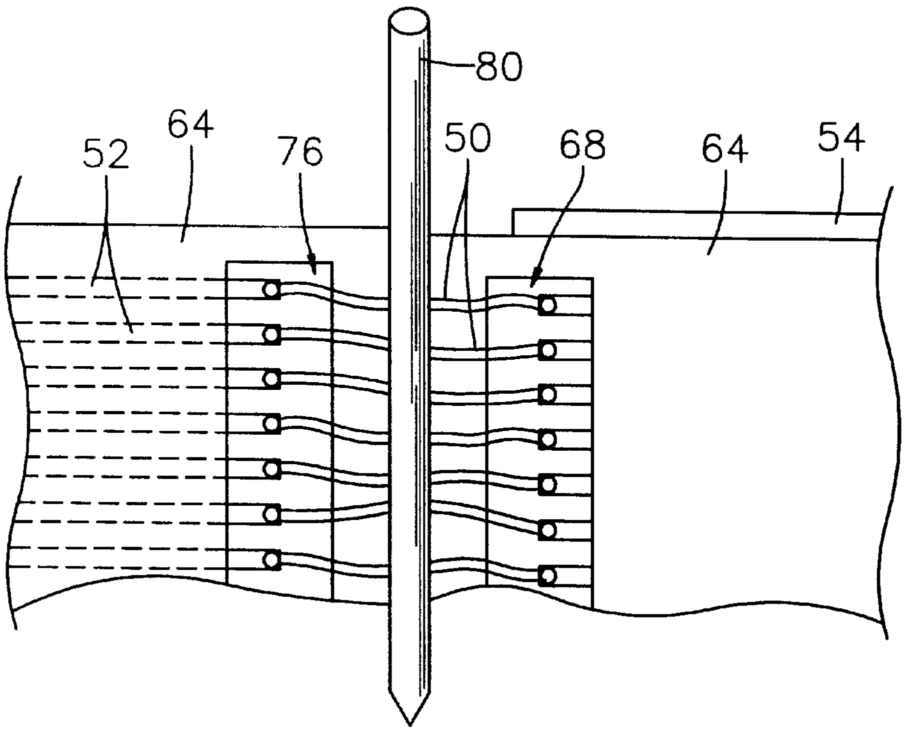
FIG. 5 is an enlarged top plan view of a nozzle plate for a printhead according to the invention showing the windows and wire bonds before encapsulation of the wires with a protective sealant.

Referring now to FIG. 5, prior to coating the wire 50 and windows 68 and 76 with the elastomeric material 78, the wire 50 is depressed downward and sideways toward the nozzle member 64 in order to reduce the overall height of the loop of wire 50 above the top surface of the nozzle member to below about 10 mils, preferably below about 5 mils, yet the wires 50 retain extra length for expansion purposes. Typically, the wire has an undepressed height of from about 15 mils to about 40 mils above the top or exposed surface of the nozzle member 64. Thus, in accordance with the invention, the height of each loop is reduced by from about 30% to about 90% of its original loop height above the nozzle member 64. Suitable apparatus for depressing the wire 52 to decrease the loop height is a wooden dowel or TEFLON stylus 80 having a diameter of from about 1 millimeter to about 5 millimeters and a length of from about 10 to about 50 millimeters. However, it is anticipated that suitable automated machinery may be used for this purpose.

Once the wire 50 is depressed so that a maximum loop height of about 5 mils above the top or outer surface of the nozzle member 64 is obtained, the depressed wire 52 is preferably coated with the elastomeric material 78 (FIG. 4). Because the wire 52 has been depressed to reduce its height above the exposed surface of the nozzle member 64, a thinner coating of elastomeric material 78 may be used to adequately cover the wire 52 and windows 68 and 76 and wire bonds 56 and 58, e.g., a coating of from about 8 to about 10 mils above the exposed surface of the nozzle member 64. The layer of elastomeric material 78 is preferably no thicker than about 10 mils so that a maximum clearance of about 30 to about 70 mils is maintained between the highest point on the printhead assembly 12 and the print media.

While specific embodiments of the invention have been described with particularity above, it will be appreciated that the invention is equally applicable to different adaptations well known to those skilled in the art.

What is claimed is:

1. A method for making a printhead for an ink jet printer, the method comprising providing a metal substrate carrier and at least one semiconductor substrate attached to the carrier, the semiconductor substrate containing energy imparting devices, electrical conductors for the energy imparting devices and electrical contacts for the conductors; attaching a polymeric tape containing electrical tracing terminating in contact pads on one side thereof to the carrier; applying an adhesive layer to the carrier and to the semiconductor substrate, the adhesive layer containing first openings over the electrical contacts on the semiconductor substrate; bonding a nozzle plate to the adhesive layer on the carrier and semiconductor substrate, the nozzle plate having an outer surface and containing second openings over the electrical contacts on the semiconductor substrate; connecting the electrical contacts with the contact pads using a wire bonding process to form wire loops sufficient for thermal expansion and contraction of the substrate and carrier; positioning the wire loops so that a highest portion of each wire is below about 8 mils above the outer surface of the nozzle plate; and coating the electrical contacts, contact pads and wire loops with a silicone polymer coating to provide an ink jet printhead.

2. The method of claim 1 wherein the second openings are provided by photoetching or laser ablating the nozzle plate.

3. The method of claim 1, wherein the silicone polymer coating over the wire loops has a thickness above the outer surface of the nozzle plate of from about 8 to about 15 mils.

4. The method of claim 1 wherein the wire loops are positioned by application of a downward external force thereto using a TEFLON stylus.

5. The method of claim 1 wherein at least three semiconductor substrates are attached to the substrate carrier.

6. The method of claim 1 wherein the substrate carrier is comprised of a metal selected from the group consisting of aluminum, zinc, gold, copper, silver, tungsten, beryllium and alloys and mixtures of two or more of the foregoing metals.

7. A method for making wire bond connections between a printhead semiconductor substrate and a flex circuit which comprises providing a flex circuit containing contact pads; bonding a nozzle plate onto the flex circuit and onto a semiconductor substrate containing electrical contacts, the nozzle plate having an exposed surface and containing first windows over the contact pads and second windows over electrical contacts on a semiconductor substrate; attaching a wire between the contact pads and electrical contacts, the wire having a loop height extending above the exposed surface of the nozzle plate; depressing the wire with a device sufficient to reduce the loop height to below about 8 mils above the exposed surface of the nozzle plate; and coating the wire and windows with a silicone polymer coating having a thickness of less than about 15 mils above the exposed surface of the nozzle plate.

8. The method of claim 7 wherein the first and second windows are formed by conventional photoetching or laser ablation techniques.

9. The method of claim 7 wherein the silicone polymer coating over the wire loops has a thickness above the exposed surface of the nozzle plate of from about 8 to about 15 mils.

10. The method of claim 7 wherein the device for depressing the wire loops comprises a TEFLON stylus.

11. The method of claim 7 further comprising providing a metal substrate carrier for conducting heat away from the semiconductor substrate and attaching the semiconductor substrate and flex circuit to the substrate carrier.

12. The method of claim 11 wherein the metal for the substrate carrier is selected from the group consisting of aluminum, zinc, gold, copper, silver, tungsten, beryllium and alloys and mixtures of two or more of the foregoing metals.

13. The method of claim 7 wherein at least three semiconductor substrates are attached to the substrate carrier.

* * * * *